P. GRISWOLD.
Grain Separator.
No. 54,895. Patented May 22, 1866.
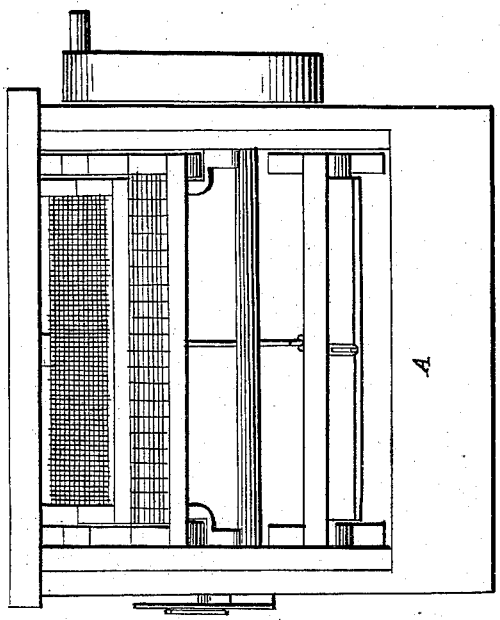
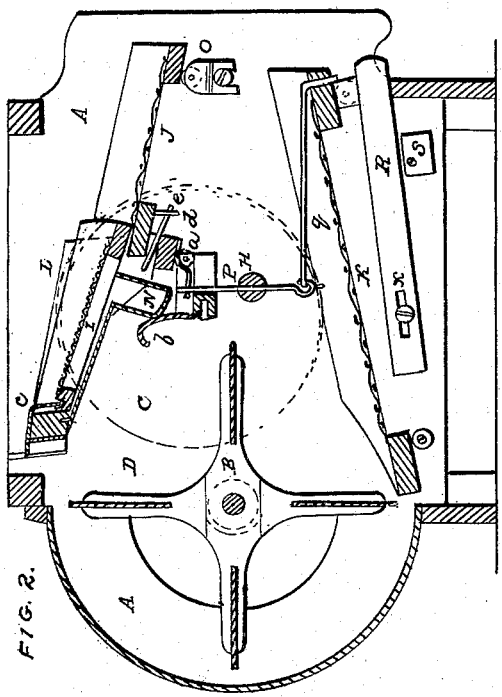
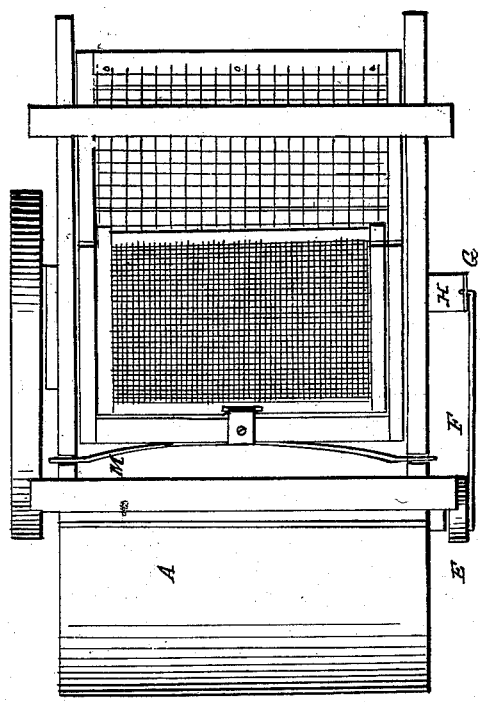

UNITED STATES PATENT OFFICE.

P. GRISWOLD, OF HUDSON, MICHIGAN.

IMPROVEMENT IN GRAIN-SEPARATORS.

Specification forming part of Letters Patent No. 54,895, dated May 22, 1866.

*To all whom it may concern:*

Be it known that I, P. GRISWOLD, of Hudson, in the county of Lenawee and State of Michigan, have invented certain new and useful Improvements in Grain-Separators; and I do hereby declare that the following is a full, clear, and exact description of the same, reference being had to the accompanying drawings, and to the letters of reference marked thereon.

In the annexed drawings, Figure 2 represents a longitudinal vertical section. Fig. 1 represents a plan view. Fig. 3 represents an end view of the machine.

By reference to the letters upon the drawings it will be seen that A represents the frame of the machine, which is constructed in any of the known and ordinary ways, and of any desired size. This frame is provided, as is usual with grain-separators, with a fan, B, constructed in any of the known ways.

C (seen in dotted line, Fig. 2) represents the driving-wheel of the machine, which is secured upon a short shaft attached to the frame A. This driving-wheel is connected by a belt, D, to a pulley on the end of the shaft of the fan B, upon the same side of the machine with said wheel.

The fan-shaft is provided at its opposite end with another pulley, E, which has a pin eccentrically secured upon its outer face. A rod, F, connects this pin upon pulley E with an arm, G, which is secured upon the end of a shaft, H, which passes through, having its bearings in frame A. Within the frame A are situated three screens, I J K, the situations and inclinations of which will be seen in Fig. 2.

L represents a movable frame, which is situated within the frame A near its top, and under the hopper in which the grain is placed to be cleaned. The front and higher side of this frame L is supported by a strip of metal, M, which is secured at its center to the said frame, the ends of the metal strip, which acts as a spring, resting and being supported in slots in the frame A. The frame L is provided with a solid inclined bottom, at the lower side of which is situated a trough, N. The bottom of this trough slopes off both ways from its center, so as to empty whatever falls into it from both ends. The bottom and the trough are firmly secured together, the bottom itself being pivoted to the higher but under side of the frame L.

A bar passes across the frame A, under the lower end of the frame L, and supported upon and pivoted to said bar near its ends are two rollers, *a a*, upon which the lower end of the frame L rests.

*b* represents a piece of metal, curved as shown, Fig. 2, one end of which is secured to the bar above mentioned. The lower side or one edge of the lower side of the trough N strikes against this piece of metal *b* when the machine is in operation, and, rising upon its curve, the said trough, with its connections, is given a vertical motion.

The screen I rests in the frame L, as seen, over the bottom and trough N, and is kept in its place by a small keeper, C, secured to the said frame L at its upper side.

The screen J, at its upper side, rests upon a ledge in the lower side of frame L, and is connected to it by a pin, *d*, and hook *e*.

O represents cleats, the lower ends of which are provided with slots, through which pins or screws pass to confine them to the frame A, and by means of which they may be adjusted up or down. Upon the upper ends of these cleats are pivoted friction-rollers, and upon these friction-rollers the lower side of the screen J rests.

P represents a rod which passes through the shaft H, its ends projecting upon both sides, as shown. The upper end of this rod passes into an opening cut in a metallic plate, *i*, secured to the lower and under side of the frame L. The lower end of this rod hooks into the end of a rod, *q*, which connects it to the screen K, as seen in Fig. 2. The shaft H has an oscillating motion communicated to it from the rod F, and thus through its rod P gives a vibratory motion to the frame L and the three screens I J K.

R represents a bar which is slotted, as seen at *x*. Through this slot a screw passes to confine or attach it to the frame A.

S represents a square block, or nearly square, which is situated under the rear end of bar R. This block is pivoted eccentrically to the inside of the frame A, and the rear end of bar R rests upon it. By turning the block around it will be seen that it elevates the end of bar R to four different positions.

The rear and upper end of screen K is provided with friction-rollers, and these rollers rest upon bar R. The lower end of screen K rests upon friction-rollers pivoted to the frame A. The object of the adjustable bar R is to raise and lower the upper end of screen K to suit the nature of the case.

In using this machine it will be understood that a hopper is placed over the frame L, so that the grain to be cleaned will fall upon the screen I, which is made fine, so that only small seeds, such as grass-seed, &c., will pass through it. This small seed falls upon the bottom beneath said screen and passes down into trough N, and thence out at the ends of said trough. The large grain falls upon the next screen, J, and it being more coarse, said grain passes through, the straw and heads, &c., being blown away through the end of the machine by the fan. The grain next falls upon screen K, and by the slant of said screen, together with its motion, the grain is caused to move back toward the fan, where it passes through an orifice in the bottom of the machine at the rear end of the screen. As the grain falls from screen J to screen K the blast of air from the fan strikes through it, carrying away dust and small trash. All small seed and trash which falls upon screen K with the grain either passes through said screen K, and is thus separated from the grain, or is blown away by the fan-blast as the grain passes down said screen toward the fan and the orifice, through which it escapes from the machine.

Having thus fully described my invention, what I claim as new, and desire to secure by Letters Patent, is—

1. The arrangement of the frame L, with its vibrating bottom and trough N attached, with the screen I, substantially as and for the purpose herein specified.

2. The arrangement of the shaft H, rod P, and curved plate *b* with the frame L, for the purpose of giving the bottom of said frame and the screen I a vibratory as well as a vertical motion, as and for the purpose specified.

3. The adjustable cleat O, as constructed, when arranged with the screen J, as and for the purpose specified.

4. The arrangement of the bar R, button S, and screen K, the same being constructed and used as and for the purpose herein set forth.

As evidence that I claim the foregoing I have hereunto set my hand in the presence of two witnesses.

P. GRISWOLD.

Witnesses:
L. R. PEIRSON,
C. F. AVERY.